Dec. 25, 1951 J. L. CLARK ET AL 2,580,075
MACHINE FOR MAKING BOWL COVERS
Filed Jan. 3, 1949 4 Sheets-Sheet 2
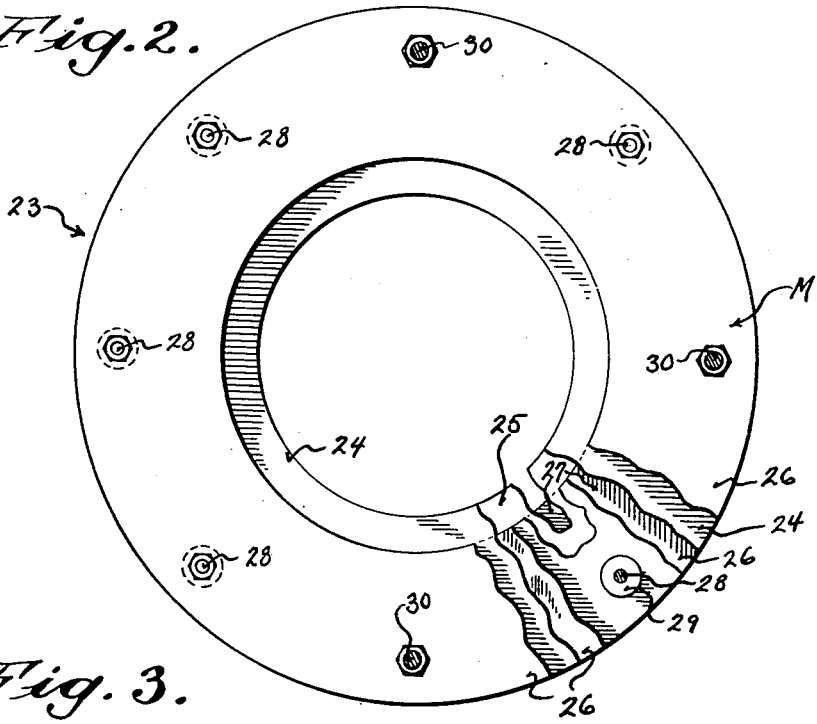
Fig. 2.
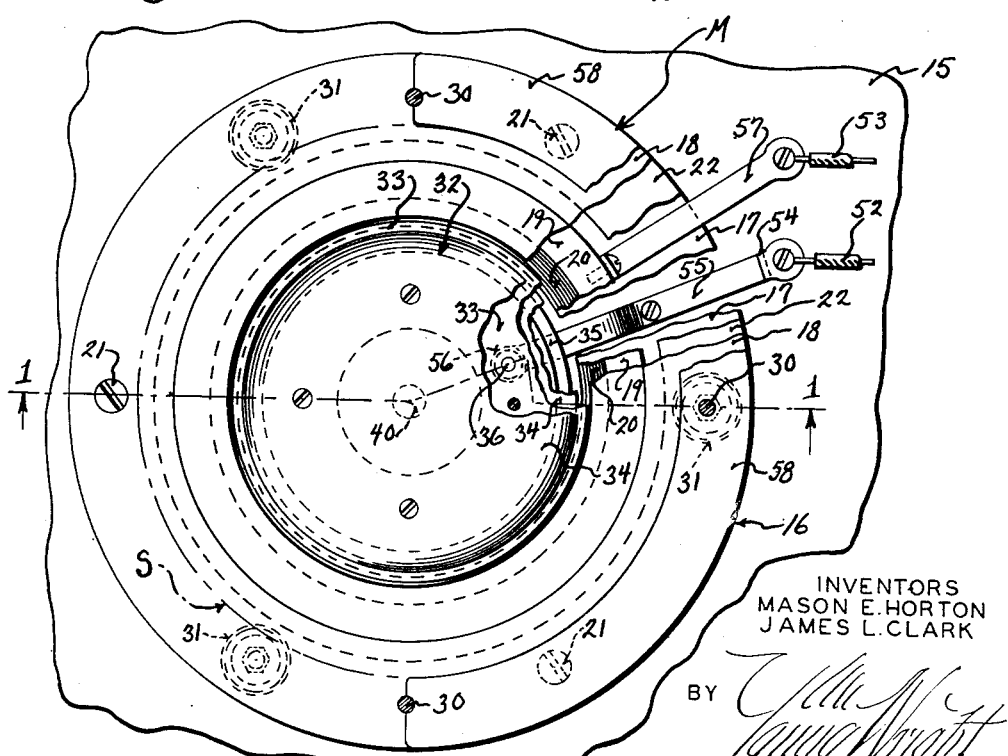
Fig. 3.
INVENTORS
MASON E. HORTON
JAMES L. CLARK
BY 
ATTORNEYS

INVENTORS
MASON E. HORTON
JAMES L. CLARK

BY

ATTORNEYS

Dec. 25, 1951  J. L. CLARK ET AL  2,580,075
MACHINE FOR MAKING BOWL COVERS
Filed Jan. 3, 1949  4 Sheets-Sheet 4
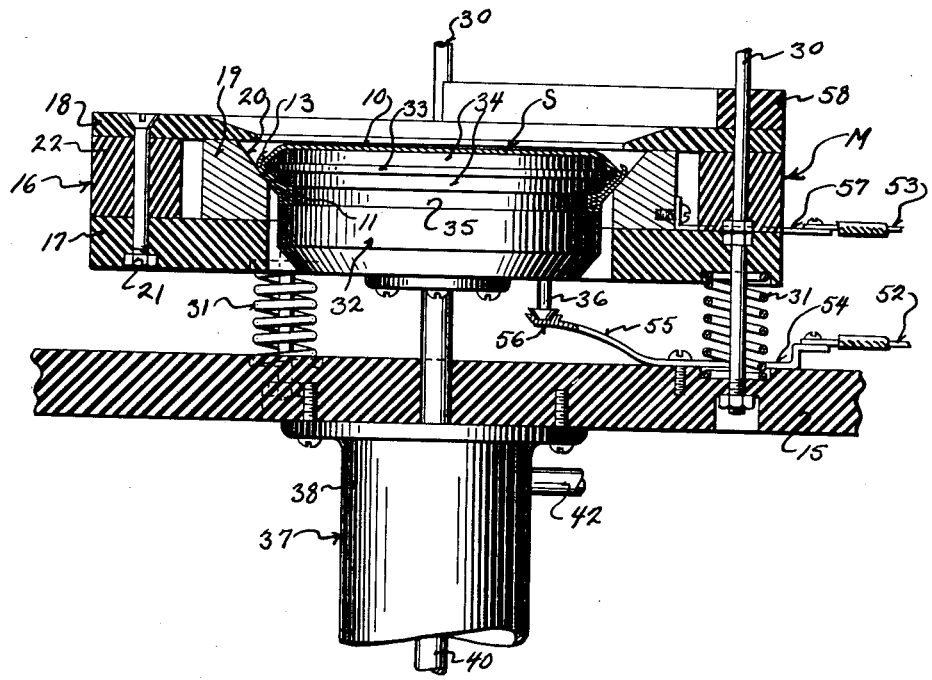
Fig. 7.
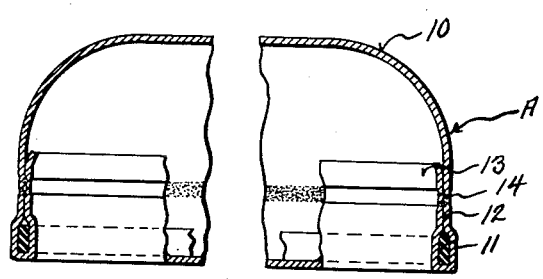
Fig. 8.
INVENTORS
MASON E. HORTON
JAMES L. CLARK
BY 
ATTORNEYS Patented Dec. 25, 1951

2,580,075

UNITED STATES PATENT OFFICE 2,580,075

MACHINE FOR MAKING BOWL COVERS

James L. Clark and Mason E. Horton, Milwaukee, Wis., assignors to Clarvan Corporation, Milwaukee, Wis.

Application January 3, 1949, Serial No. 68,895

8 Claims. (Cl. 154—1)

This invention appertains to an apparatus for constructing bowl and jar covers, bathing caps and the like from thermoplastic sheets, such as vinyl film.

One of the primary objects of this invention is to provide means whereby vinyl and like thermoplastic films can be quickly and economically converted into strong and durable covers for bowls, jars and the like; bathing and shower caps and similar articles.

Another salient object of this invention is to provide a machine, whereby flat sheets of vinyl and like thermoplastic film can be efficiently handled to permit the association therewith of elastic bands and thereafter folding around their peripheral edges to form a sealed seam enclosing the elastic bands.

A further object of this invention is to provide a machine embodying a reciprocating, forming head movable through a combination sealing die and support and a set of forming wipers, the head functioning to pick up a sheet of thermoplastic film from the combined sealing die and support and carry the same through the forming wipers so that initially the sheet upon upward movement of the head will be folded down around the head for the reception of the elastic band and, second, upon downward movement of the head for folding the edges of the sheet up around the elastic band, whereby upon further downward movement of the head the folded sheet will be carried into the sealing die for fusing the folded edge with the body of the sheet by electronic or heat sealing and pressure.

Another further object of the invention is to provide automatic means for electronically sealing the folded edge to the body of the sheet when the head moves into the sealing die.

A further object of the invention is to provide means for permitting an operator to quickly center the sheets upon the combined sealing die and support, so that the same can be quickly picked up by the forming head, as the same moves toward the forming wipers.

With these and other objects in view, the invention consists in the novel construction, arrangement and formation of parts, as will be hereinafter more specifically described and claimed and illustrated in the accompanying drawings, in which drawings:

Figure 2 is a horizontal sectional view taken on the line 2—2 of Figure 1, looking in the direction of the arrows and showing the bottom of the forming wipers.

Figure 3 is a horizontal sectional view taken on the line 3—3 of Figure 1, looking in the direction of the arrows and showing the top of the combined sealing die and support.

Figure 7 is a fragmentary vertical sectional view showing the fifth step in our method with the forming head in the sealing die and bringing about the electronic sealing of the folded edge with the body of the sheet.

Figure 8 is a diametric section through an article completed on the illustrated machine in accordance with our method.

Referring to the drawings in detail, wherein similar reference characters designate corresponding parts throughout the several views, the letter M generally indicates the novel machine for converting thermoplastic sheets S into jar and bowl covers or bathing and shower caps and similar articles A.

Figure 1:
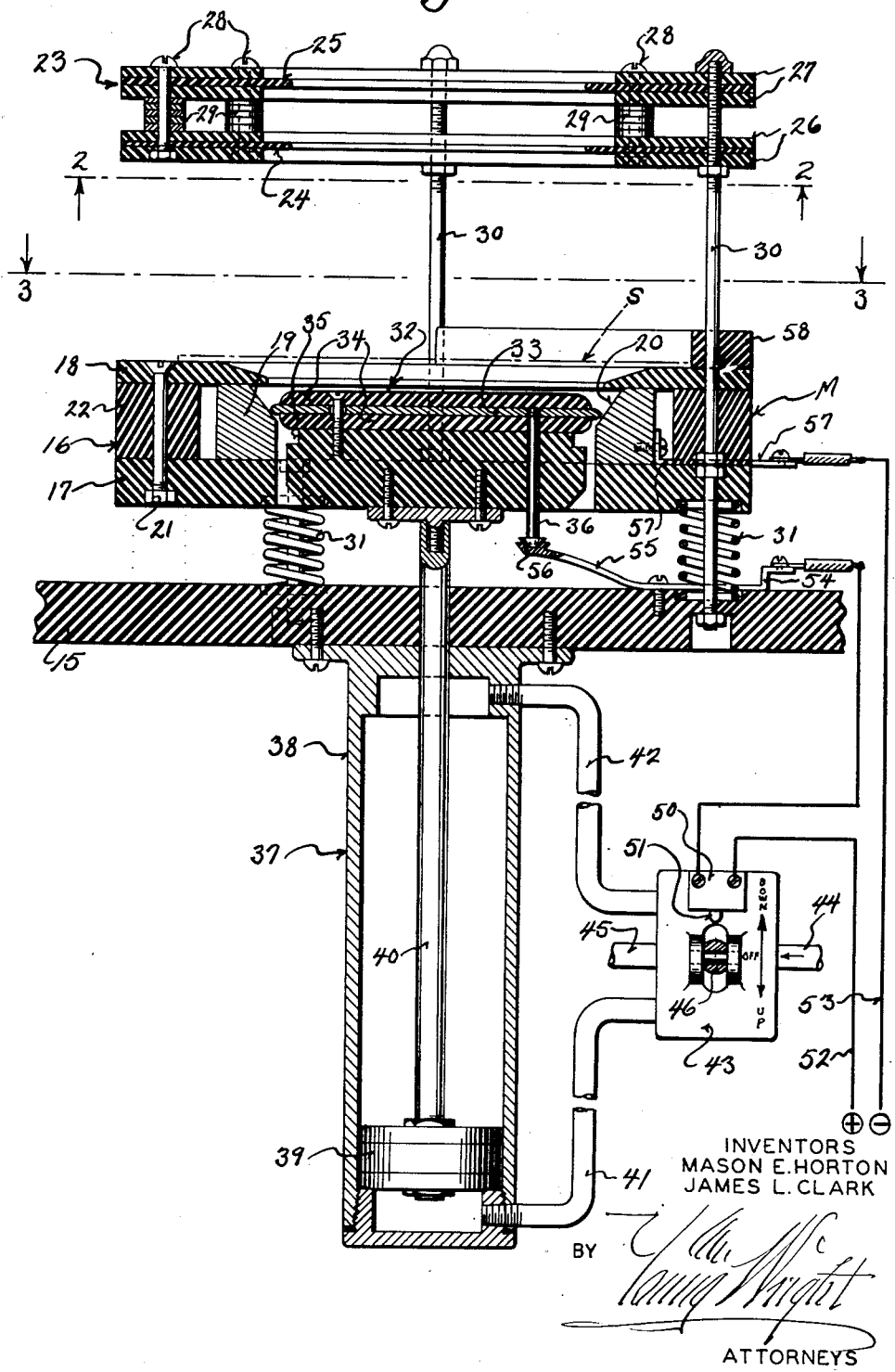
Figure 1 is a vertical sectional view through a machine constructed in accordance with our invention for forming jar covers and the like from thermoplastic sheets, the view showing the initial step in the forming of the covers, with the head in its lowered position, the section being taken on the line 1—1 of Figure 3, looking in the direction of the arrows.

The article A is best shown in Figure 8 of the drawings and includes a body portion 10 formed from a thermoplastic film or sheet with its edge folded around an elastic band 11 to form a seam 12. The folded edge 13 of the sheet or body 10 is permanently fused as at 14 with the sheet or body 10 to produce the seam 12. The resulting seam will be strong and durable and due to the fusing the band 11 is hermetically sealed within the seam.

The novel machine M for making the jar or like covers of the type shown in Figure 8 of the drawings comprises a support or frame 15, the top of which is preferably formed from electric insulating material. This frame has mounted thereon a combination sealing die and sheet supporter 16, embodying a rigid annular lower plate 17. Arranged in superimposed relation to the plate 17 is a top annular plate 18 which may or may not be formed from semi-flexible material. These plates 17 and 18 are arranged in axial alignment and have clamped therebetween an annular electrode which forms a part of the sealing die. This electrode 19 is also arranged in axial alignment with the plates 17 and 18. The inner periphery of the electrode 19 at its upper edge is beveled inwardly as at 20 for a purpose, which will later appear, and this bevel is important to this invention.

The plates 17 and 18 are rigidly connected together by bolts 21 or the like, and spacers 22 can be employed between the plates 17 and 18. The plates 17 and 18 and their spacers 22 are preferably formed from electric insulating material.

At this point, it is to be noted that the upper plate 18 has its inner periphery extending inwardly beyond the beveled surface 20 of the electrode 19, and the upper surface of the plate 18 at its inner periphery can also be beveled inwardly and downwardly for a purpose, which will also later appear.

Arranged above the combination sealing die and sheet supporter is the forming wiper unit 23. This unit is arranged above and in spaced relation to the die and supporter 16 and embodies a lower forming wiper 24 and an upper forming wiper 25. These forming wipers 24 and 25 are preferably formed from flexible material such as sheet rubber and are of an annular shape. The lower forming wiper 24 is firmly clamped between annular holding rings 26 and the upper forming wiper 25 is firmly clamped between similar clamping rings 27. The wipers extend inwardly beyond the inner edges of their clamping rings. The forming wipers 24 and 25 are firmly clamped together by bolts 28 and are held in proper spaced relation by spacing washers 29 carried by said bolts. The unit 23, itself, is rigidly secured to depending guide rods 30 and these rods extend through and are connected with the sealing die and supporter 16. The lower ends of the rods slidably extend through the frame 15. Relatively heavy expansion springs 31 are coiled about the guide rods 30 and function to normally hold the rods, the die and supporter, and the wiper unit 23 in a raised position. It is to be noted that the wiper unit 23 is arranged in direct axial alignment with the die and supporter 16.

Mounted for reciprocatory movement through the die and supporter 16 and the wiper unit 23, is a forming head 32. This forming head 32 is essentially of a cylindrical shape and is of such a size as to permit the passage thereof in the forming die 16 and through the wiper unit 23. The head has incorporated therewith a sealing electrode 33, which can be in the nature of a disc and this electrode extends beyond the outer periphery of the forming head and is of a slightly greater diameter than the interior diameter of the electrode 19 below its beveled edge 20, for a purpose, which will be later described. The electrode 33 is firmly clamped between a pair of discs 34 and these discs with the electrode 33 are secured to the forming head and form a part of the forming head. The head below the electrode is provided with an annular groove 35. The electrodes 19 and 33 cooperate together and form a part of a high frequency electronic sealing means. All parts of the head with the exception of the electrode are preferably formed from electric insulating material. Also carried by the head is a contact switch point 36, which is electrically connected with the electrode 33. The head 32 can be reciprocated in any desired manner, providing the mechanism will give the desired proper sequence of operation. As illustrated, we have provided an air motor 37 for this purpose and the same consists of a cylinder rigidly secured to the frame 15. Slidably mounted within the cylinder 38 is a piston 39. Secured to the piston 39 is a piston rod 40, which is rigidly secured to the head 32.

Communicating with the opposite ends of the cylinder 38 are combination inlet and exhaust pipes 41 and 42, respectively. These air conducting tubes communicate with a control valve 43 of any conventional design now found on the open market, and as particularly manufactured by Airmatic Valve Inc., style HF-4-250. This valve has leading into the same a pipe 44 leading from a suitable source of supply of compressed air. The valve casing also has leading therefrom an exhaust pipe 45. An operating lever 46 for the valve is provided and when the lever is in a powered position, air will be admitted from the pipe 44 through valve casing and pipe 41, to the lower end of the cylinder, and communication will be established between the pipes 42 and the exhaust pipe 45. This will bring about the raising of the piston and the head 32. When the valve lever 46 is moved to a raised position communication will be established between the pipe 41 and the exhaust pipe 45 and between the inlet pipe 44 and the pipe 42. In this position of the valve handle the piston will be lowered.

Carried by the valve casing 43 above the lever is an electric switch 50 of the micro type. This switch includes a switch closing plunger 51 and when the valve handle is in its extreme raised position the same will operate the plunger 51 to close a circuit. At this time, attention is called to the fact that the lever can be moved to a partially raised position for bringing about the lowering of the head and that when the head reaches a desired lowered position the handle 46 can be raised a slightly further distance for actuating the switch plunger 51.

Electrical current of the desired character is supplied from any suitable source to the electrodes 19 and 33 and supply and return wires 52 and 53 are provided. The wire 52 is electrically connected to a terminal 54 carried by the frame 15 of the machine. This terminal has electrically connected therewith a leaf spring 55, terminating in a contact cup 56, which is adapted to be engaged by the contact plunger 36 when the head 32 is in an extreme lowered position. The wire 53 is electrically connected to a terminal 57 and this terminal is in turn electrically connected to the electrode 19. The switch 50 can be interposed in the wire 52, as illustrated in Figure 1 of the drawings.

Figure 4:
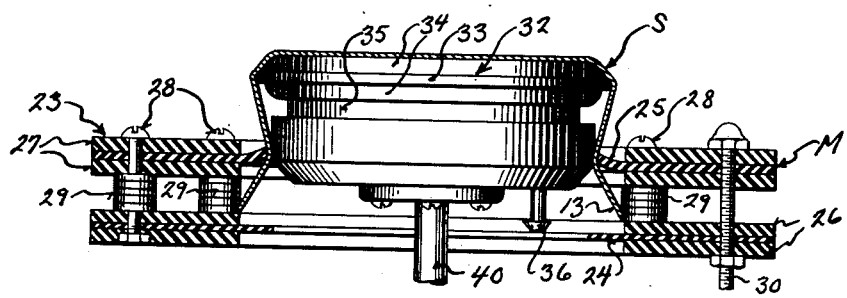
Figure 4 is a fragmentary vertical sectional view showing the second step in our method of producing the covers, the head being shown in its partly raised position in the forming wipers.
Figure 5:
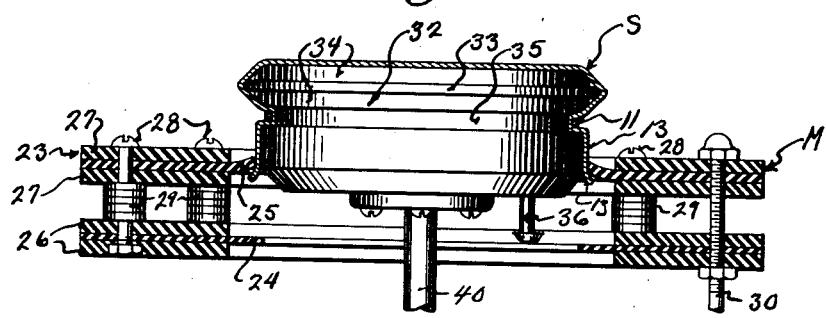
Figure 5 is a view similar to Figure 4, showing the head in its extreme raised position and illustrating the third step in our method with the elastic band placed around the thermoplastic sheet.
Figure 6:
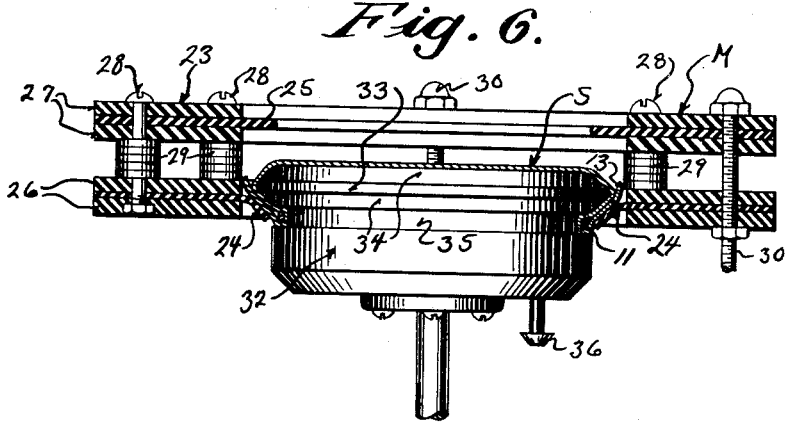
Figure 6 is a view similar to Figures 4 and 5 showing the fourth step in our method, the head being on its downward rear stroke for the upward folding of the edge of the body of the sheet over the elastic band.

In accordance with our method and machine the lever 46 is initially moved to its partially raised position for bringing about the lowering of the head 32 as shown in Figure 1 of the drawings. A flat sheet S of a desired size of a thermoplastic film is now laid on top of the forming die and supporter 16 by the operator. In order to facilitate the centering of this sheet S on top of the die an arcuate guide rib 58 is secured to the die above the plate 18. The hand lever 46 is now swung down so that the head will be moved upward. As the head moves up the same will lift the sheet S off of the die and supporter 16 and carry the same toward the forming wiper unit 23. As the head 32 moves through the forming wiper unit 23, the upper and lower wipers 24 and 25 will pull down on the sheet S and bring the same around the head and the upper wiper 25, see Figure 4, will hold the sheet around the head. This is the extreme upper position of the head. The operator, now puts an elastic band 11 around the sheet S and this band will fit into the annular groove 35 in the head. This will effectively hold the sheet over the upper end of the head 32. This is best shown in Figure 5 of the drawings, and constitutes the third step of operation. The handle lever 46 of the valve is now swung up to a partially raised position for establishing communication between the inlet pipes 44 and 42 and the head 32 will start its downward travel. As the edge of the sheet rides past the lower wiper 24 with the head 32 this wiper will fold up the edge of the sheet over the rubber band 11. This constitutes the fourth step of operation, as best shown in Figure 6. Upon continued downward movement of the head 32, the same will ride into the sealing die and supporter 16, as best shown in Figure 7. As the head 32 rides into the sealing die, the upper plate 18 will engage the edge of the sheet and continue to hold up the edge of the sheet around and over the band 11, until the edge of the sheet engages the electrode 19. The operator now moves the hand lever 46 a slightly further distance upward closing the switch 50. At this time the contact 36 will engage the contact 56 and the edge of the sheet will be fused to the body of the sheet by the electronic sealing action. Pressure is exerted against the edge and the body of the sheet S due to the fact that the electrode plate 33 will ride down the beveled face 20 of the electrode 19 to gradually increase pressure between itself and the electrode 19. This constitutes the fifth step of the operation. Undue pressure between the electrode 33 and the electrode 19 is prevented due to the resilient mounting of the die 16 on the frame 15. The sealing is practically instantaneous and the operator can immediately move the hand lever 46 upward so that the head 32 will travel above the sealing die and supporter so as to permit the operator to strip the formed jar or like cover off of the head. This constitutes the final step.

The head can now be returned to its normal position and a new sheet S placed over the head on the sealing and supporting die.

Changes in details may be made without departing from the spirit or the scope of this invention, but what we claim as new is:

1. A machine for forming articles of the type having a hem and an elastic band therein comprising an annular sealing die adapted to support a thermoplastic sheet, a stationary wiper unit arranged above and in spaced relation to the die and in axial alignment therewith, a reciprocating forming head movable through the die for lifting a sheet off of the die and into the wiper unit, said head being movable on a return stroke out of and below the wiper unit and into the sealing die.

2. A machine for forming articles having a hem and an elastic band therein comprising a combination sealing die and support, a thermoplastic sheet initially supported thereon, a stationary wiper unit arranged above and in spaced relation to the die including a pair of spaced annular flexible wipers, a head movable through the die to a raised position for carrying a sheet to the wipers, said wipers engaging and folding the sheet over the head, said head having an annular groove for the reception of a rubber band whereby to hold the sheet around the head, the lowermost wiper engaging the edge of the sheet upon the downward movement of the head to fold said edge over the band, an annular electrode carried by the sealing die, an electrode carried by the head and projecting beyond the head for engaging the annular electrode to hold said edge against the body of the sheet.

3. A machine for forming articles having a hem and an elastic band therein comprising a combination sealing die and support, a thermoplastic sheet initially supported thereon, a stationary wiper unit arranged above and in spaced relation to the die including a pair of spaced annular flexible wipers, a head movable through the die to a raised position for carrying the sheet to the wipers, said wipers engaging and folding the sheet over the head, said head having an annular groove for the reception of a rubber band whereby to hold the sheet around the head, the lowermost wiper engaging the edge of the sheet upon the downward movement of the head to fold said edge over the band, an annular electrode carried by the sealing die, an electrode carried by the head and projecting beyond the head for engaging the annular electrode to hold said edge against the body of the sheet, said annular die having a beveled inner peripheral leading surface adapted to be engaged by the electrode carried by the head.

4. A machine for forming articles having a hem and an elastic band therein comprising a combination sealing die and support, a thermoplastic sheet initially supported thereon, a stationary wiper unit arranged above and in spaced relation to the die including a pair of spaced annular flexible wipers, a head movable through the die to a raised position for carrying the sheet to the wipers, said wipers engaging and folding the sheet over the head, said head having an annular groove for the reception of a rubber band whereby to hold the sheet around the head, the lowermost wiper engaging the edge of the sheet upon the downward movement of the head to fold said edge over the band, an annular electrode carried by the sealing die, an electrode carried by the head and projecting beyond the head for engaging the annular electrode to hold said edge against the body of the sheet, said annular die having a beveled inner peripheral leading surface adapted to be engaged by the electrode carried by the head, and means for completing an electric circuit through the electrodes including a contact arranged below the die and a contact carried by said head engageable with the first contact when said head is in its extreme lowered position.

5. A machine for forming articles having a hem and an elastic band therein comprising a combination sealing die and support, a thermoplastic sheet initially supported thereon, a stationary wiper unit arranged above and in spaced relation to the die including a pair of spaced annular flexible wipers, a head movable through the die to a raised position for carrying the sheet to the wipers, said wipers engaging and folding the sheet over the head, said head having an annular groove for the reception of a rubber band whereby to hold the sheet around the head, the lowermost wiper engaging the edge of the sheet upon the downward movement of the head to fold said edge over the band, an annular electrode carried by the sealing die, an electrode carried by the head and projecting beyond the head for engaging the annular electrode to hold said edge against the body of the sheet, said annular die having a beveled inner peripheral leading surface adapted to be engaged by the electrode carried by the head, and means for reciprocating said head.

6. A machine for forming articles from thermoplastic sheets of the type having a hem and an elastic band enclosed therein comprising a sealing die and support for the sheets having an axial opening, a stationary forming wiper unit having an axial opening arranged above and in spaced relation to the die and support and in axial alignment therewith, said forming wiper unit including spaced upper and lower flexible wipers, said die and support including an annular electrode, a thermoplastic sheet on said die, a head mounted for movement in the die and into and out of the wiper unit for carrying the sheet from the die and support to said wiper unit, said wipers engaging the edge of the sheet upon the upward movement of the head to carry the sheet around the head, whereby the elastic band can be placed on said head for holding the sheet around the head, said lower wiper engaging the edge of the sheet upon downward movement of the head to fold said edge over the band, said head having an electrode, the head carrying the folded edge of the sheet into the die with the folded edge of the sheet between the annular electrode and the electrode carried by the head.

7. A machine for forming articles from thermoplastic sheets of the type having a hem and an elastic band enclosed therein comprising a sealing die and support for the sheets having an axial opening, a stationary forming wiper unit having an axial opening arranged above and in spaced relation to the die and support and in axial alignment therewith, said forming wiper unit including spaced upper and lower flexible wipers, said die and support including an annular electrode, a thermoplastic sheet on said die, a head mounted for movement in the die and into and out of the wiper unit for carrying the sheet from the die and support to said wiper unit, said wipers engaging the edge of the sheet upon the upward movement of the head to carry the sheet around the head, whereby the elastic band can be placed on said head for holding the sheet around the head, said lower wiper engaging the edge of the sheet upon downward movement of the head to fold said edge over the band, said head having an electrode, the head carrying the folded edge of the sheet into the die with the folded edge of the sheet between the annular electrode and the electrode carried by the head, said die also including an upper plate having a beveled edge for engaging the folded edge of the sheet to hold said edge around the rubber band until the head moves into engagement with the annular electrode.

8. A machine for forming articles from thermoplastic sheets of the type having a hem and an elastic band enclosed therein comprising a sealing die and support for the sheets having an axial opening, a stationary forming wiper unit having an axial opening arranged in super-imposed relation to the die and support and in axial alignment therewith, said forming wiper unit including spaced upper and lower flexible wipers, said die and support including an annular electrode, a thermoplastic sheet on said die, a head mounted for movement in the die and into and out of the wiper unit for carrying the sheet from the die and support to said wiper unit, said wipers engaging the edge of the sheet upon the upward movement of the head to carry the sheet around the head, whereby the elastic band can be placed on said head for holding the sheet around the head, said lower wiper engaging the edge of the sheet upon downward movement of the head to fold said edge over the band, said head having an electrode, the head carrying the folded edge of the sheet between the annular electrode and the electrode carried by the head, said die also including an upper plate having a beveled edge for engaging the folded edge of the sheet to hold said edge around the rubber band until the head moves into engagement with the annular electrode, means for reciprocating the head and means for resiliently supporting the die.

JAMES L. CLARK.
MASON E. HORTON.

REFERENCES CITED

The following references are of record in the file of this patent:

UNITED STATES PATENTS

| Number | Name | Date |
| --- | --- | --- |
| 2,366,130 | Slavek | Dec. 26, 1944 |
| 2,423,237 | Haslacher | July 1, 1947 |
| 2,466,643 | Magid | Apr. 5, 1949 |
| 2,478,121 | Morner | Aug. 2, 1949 |
| 2,484,340 | Gardner | Oct. 11, 1949 |
| 2,490,451 | Magid | Dec. 6, 1949 |
| 2,551,851 | Reid | May 8, 1951 |